E. F. COLLINS.
DYNAMO ELECTRIC MACHINE.
APPLICATION FILED JAN. 27, 1914.

1,144,351.

Patented June 29, 1915.

WITNESSES:
J. Earl Ryan
J. Ellis Glen

INVENTOR:
EDGAR F. COLLINS,
BY Albert G. Davis
HIS ATTORNEY

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

DYNAMO-ELECTRIC MACHINE.

1,144,351.  Specification of Letters Patent.  Patented June 29, 1915.

Original application filed February 19, 1913, Serial No. 749,360. Divided and this application filed January 27, 1914. Serial No. 814,628.

*To all whom it may concern:*

Be it known that I, EDGAR F. COLLINS, a citizen of the United States, residing at Schenectady, county of Schenectady, State of New York, have invented certain new and useful Improvements in Dynamo-Electric Machines, of which the following is a specification.

My invention relates to dynamo electric machines and is particularly applicable to such machines having a short-circuited winding, and has for its object a novel construction and arrangement of such a winding.

This present application is a division of my prior application for electric welding, Serial No. 749,360, filed Feb. 19, 1913.

For a fuller understanding of my invention reference may be had to the accompanying drawings, in which—

Figure 1:
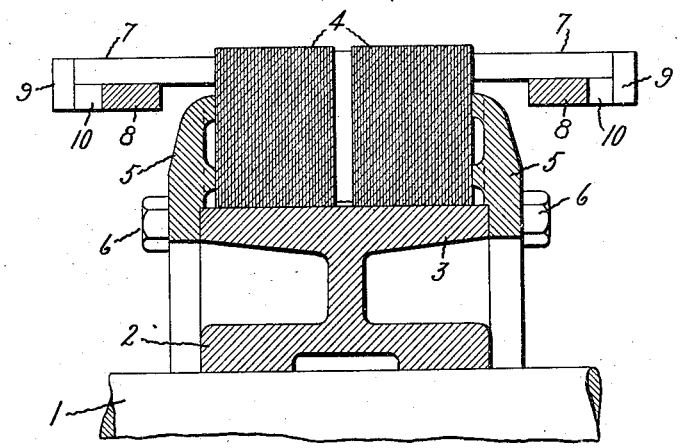
Figure 2:
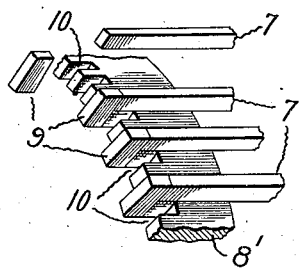
Figure 3:
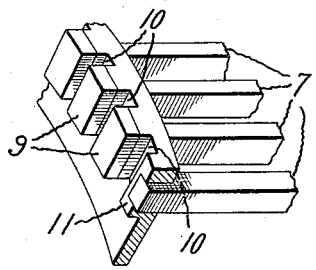

Figure 1 is a vertical section of a part of a rotor of an induction motor in which I have shown my invention embodied; Fig. 2 is a detail view showing the method of assembling certain parts of the rotor of Fig. 1, and Fig. 3 is a modification.

In the drawings, 1 is a shaft on which the armature of an induction motor, in which I have shown my invention embodied, is mounted. A spider 2 is secured on the shaft 1 and provided with a peripheral flange 3, on which is mounted the usual laminations 4. These laminations are secured in position by means of end clamping plates 5 and bolts 6. The conductor bars 7 are mounted in slots in the laminations 4 in the usual manner and are engaged at their ends by a short-circuiting ring 8. In accordance with my invention the conductor bars 7 are integrally secured to the end rings by means of metallic members 9. Preferably the members 9 extend in a substantially radial direction.

The heat radiating and conducting capacity of an end ring such as is ordinarily used is so great as to render difficult the securing of the ring integrally to the conductor bar. My invention, therefore, provides a construction in which the ring is indirectly secured to the conductor bar, which consists in securing a third member both to the end ring and to the end of the conductor bar. An effective method of securing this third member to the end ring and the conductor bar, is by welding the same to both the ring and the bars. In case this method is used, the radiation and conduction of heat from the end ring to the region of the contact surface between the end ring and the conductor bars is largely confined by providing radial slots 10 in the end ring, which extend inwardly from the outer surface of the end ring. These slots 10 in the end ring form extending projections, which are preferably of the same area as the ends of the conductor bars. This effectively segregates the metal of the end ring which is to be welded to the metallic member 9, and prevents a prohibitive radiation and conduction of heat, at the same time maintaining the contacting surface of the end ring at substantially the same temperature as that existing at the contact surface of the conductor bar.

In order to carry out my process of welding as covered by my other application above referred to, the conductor bar is placed in position on the end ring between two adjacent slots so that the end of the conductor bar rests immediately over the projection formed on the end ring between the two slots, and the end surface of the end ring and the end of the conductor bar are substantially in the same plane. The metallic member is then placed in position against both the end of the conductor bar and the projection on the end ring, the conductor bar and the end ring constituting one electrode and the metallic clip the other electrode, and, by passing a suitable amount of current between the two electrodes and applying suitable pressure between the metallic member, and the conductor bar and end ring respectively, in a manner well understood in the art, the metallic member is effectually welded to the end ring and the conductor bar, and effectively secures the latter two together, and the end ring is thus made substantially integral with the conducting bar.

In Fig. 3 I have shown a modification of my invention in which the conductor bars 7 extend through openings in the end ring 8', the openings being formed in portions 11 of the ring with slots 10 on either side. The metallic member 9 is applied in the same manner as is the clip in Fig. 2.

I desire it to be understood that my invention is not limited to the particular construction shown and described and may be applied to the short-circuited windings of synchronous motors, rotary converters and the like, and I aim in the appended claims to cover all modifications which do not depart from the spirit and scope of my invention.

What I claim as new and desire to secure by Letters Patent of the United States, is:—

1. In a dynamo electric machine, a short-circuited winding comprising conductor bars, an end ring having its end surface in substantially the same plane as the ends of the conductor bars, and metallic members integrally secured to the end ring and the conductor bars, the end ring being provided with radial slots extending inwardly from the end surface and located between the conductor bars.

2. In a dynamo electric machine, a short-circuited winding comprising conductor bars, an end ring provided with projections, each of said projections having substantially the same area as each of the ends of the conductor bars, and metallic members integrally secured to the ends of the conductor bars and to the end ring.

3. In a dynamo electric machine, a short-circuited winding comprising conductor bars, an end ring provided with lateral projections, each of said projections having substantially the same area as each of the ends of the conductor bars, and metallic members integrally secured to the ends of the conductor bars and to the end ring, said members extending in a substantially radial direction.

In witness whereof, I have hereunto set my hand this 26th day of January, 1914.

EDGAR F. COLLINS.

Witnesses:
ROBT. EDWARD WAGNER,
HELEN ORFORD.